Patented Dec. 24, 1935

2,025,170

UNITED STATES PATENT OFFICE 2,025,170

2-AMINO-3-BROMO-ANTHRAQUINONE-SULPHONIC ACID AND THE ALKALI METAL SALTS THEREOF AND A PROCESS OF PREPARING THEM

Georg Kränzlein and Martin Corell, Frankfort-on-the-Main, and Wilhelm Schaich, Bad Soden-on-the-Taunus, Germany, assignors to General Aniline Works, Inc., New York, N. Y., a corporation of Delaware No Drawing. Application November 16, 1934, Serial No. 753,405. In Germany April 15, 1933

3 Claims. (Cl. 260—60)

The present invention relates to 2-amino-3-bromo-anthraquinone-sulphonic acid and the alkali metal salts thereof and to a process of preparing them.

We have found that 2-amino-3-bromo-anthraquinone may be readily sulphonated with sulphuric acid containing sulphuric anhydride. It is surprising that the sulpho group enters the unsubstituted nucleus and that there is thus obtained a water-soluble anthraquinone derivative which has the following constitution:

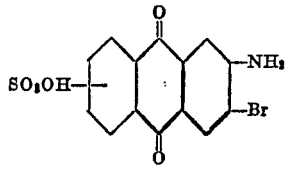

wherein the sulpho group probably stands in 6- or 7-position or is possibly a mixture of the 6- and 7-sulphonic acids. The product dyes wool yellow tints. It may be used as starting material for the manufacture of dyestuffs.

The following example serves to illustrate the invention, but it is not intended to limit it thereto; the parts are by weight:

50 parts of 2-amino-3-bromo-anthraquinone are introduced by portions, while stirring, into 200 parts of sulphuric acid containing 40% of sulphuric anhydride; the mixture is heated at a temperature of about 125° C. to about 130° C. until a test sample taken from the reaction mixture is readily soluble in water. After cooling to ordinary temperature the reaction mass is poured into ice-water. From the solution thus obtained the free sulphonic acid may be isolated as a very readily soluble substance by evaporation in a vacuum, or the dissolved sulphonic acid may be salted out with potassium chloride, the solid matter being filtered by suction, washed with a dilute potassium chloride solution and dried. The potassium salt of 2-amino-3-bromo-anthraquinone-sulphonic acid thus obtained is a valuable intermediate product. It is a yellow to orange powder which is readily soluble in water. It yields with nitrite and acid a diazo compound which forms with the sodium salt of 2-naphthol a soluble red dyestuff.

We claim:
1. The process which comprises heating 2-amino-3-bromo-anthraquinone with sulphuric acid containing sulphuric anhydride.
2. The process which comprises heating at a temperature of about 125° C. to about 130° C. a mixture of 2-amino-3-bromo-anthraquinone with sulphuric acid containing 40% of sulphuric anhydride until a test portion of the reaction product has become water-soluble.
3. The compound of the formula:

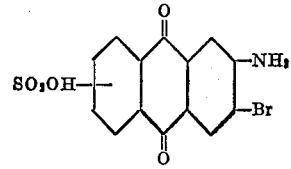

wherein the sulpho group probably stands in 6- or 7-position, and the alkali metal salts thereof, being soluble in water and yielding in known manner a diazo-compound which forms a reddish dyestuff with 2-naphthol.

GEORG KRÄNZLEIN.
MARTIN CORELL.
WILHELM SCHAICH.